June 30, 1970     R. S. LEVENTHAL     3,517,550

LOAD AND RATE OF CHANGE OF LOAD DETECTION SYSTEM

Filed May 8, 1968     2 Sheets-Sheet 1

INVENTOR
*ROBERT S. LEVENTHAL*

BY

ATTORNEY

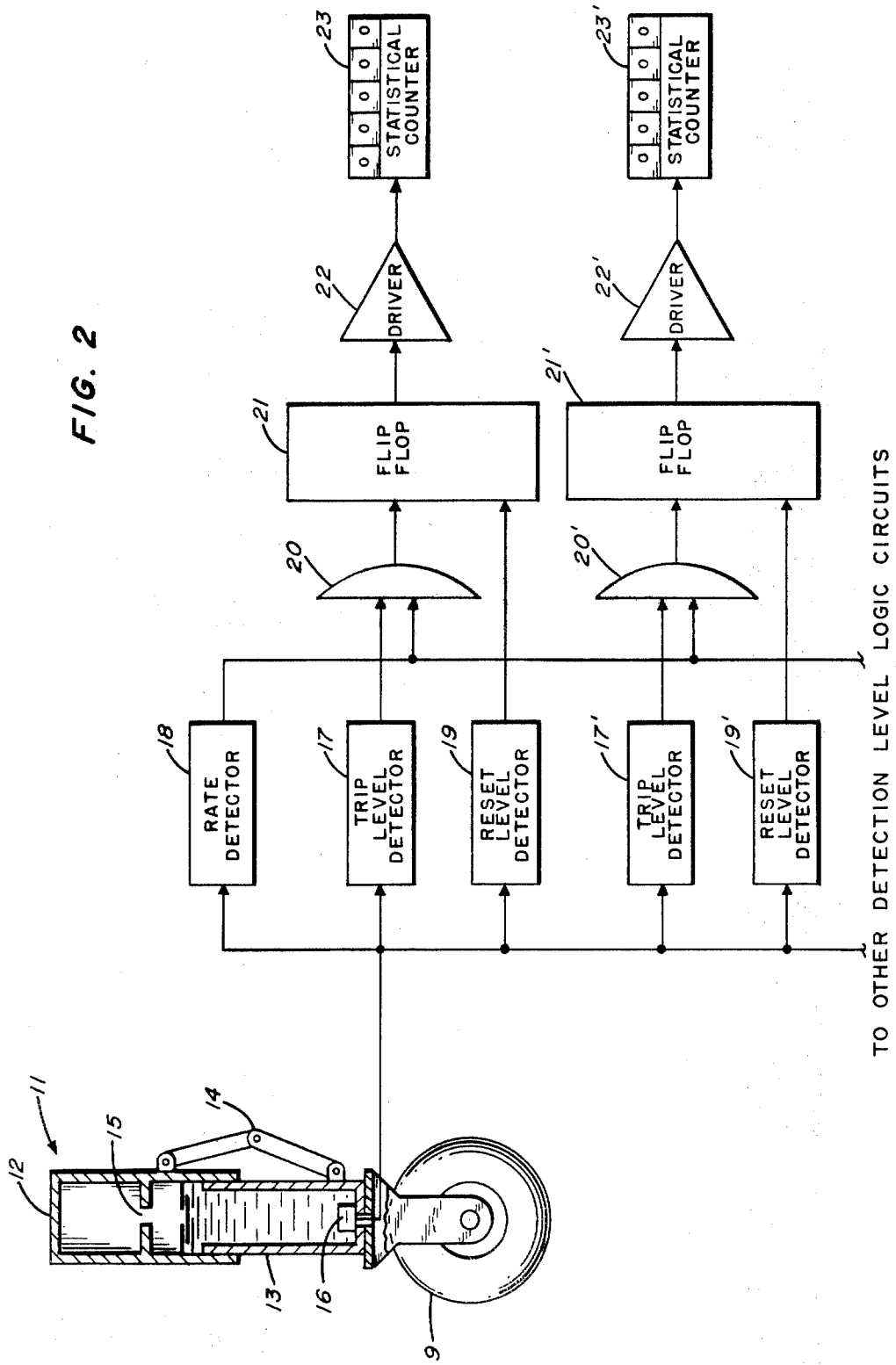

United States Patent Office 3,517,550
Patented June 30, 1970

3,517,550
LOAD AND RATE OF CHANGE OF LOAD DETECTION SYSTEM
Robert S. Leventhal, Granada Hills, Calif., assignor, by mesne assignments, to the United States of America as represented by the Secretary of the Navy
Filed May 8, 1968, Ser. No. 727,526
Int. Cl. G01b 7/16; G01l 1/02; G01n 3/00
U.S. Cl. 73—88.5                        10 Claims

ABSTRACT OF THE DISCLOSURE

The present invention relates to a system for detecting and recording the level and rate of change of landing loads in the struts of aircraft landing gear. The system utilizes pressure sensors in the struts. The sensors are connected to a plurality of measuring circuits which are operable in response to a minimum pressure to record the level and rate of change of pressure detected by the sensor.

GOVERNMENT INTEREST IN THE INVENTION

The invention described herein may be manufactured and used by or for the Government of the United States of America for governmental purposes without the payment of any royalties thereon or therefor.

BACKGROUND OF THE INVENTION

Field of the invention

This invention is directed to a system for detecting and recording the level and rate of change of landing loads in the struts of an aircraft landing gear. The system, however, has utility in all areas where it is desired to measure the level and rate of change of applied loads.

Description of the prior art

The main purpose of landing gear is to change the direction of motion at landing from a downward glide to one parallel to the ground. In the performance of this function the landing gear and the airplane are subject to large forces.

Airplanes are designed to absorb a maximum landing gear force set by Government regulations and structural limitations. If the plane is subject to a force at the landing gear greater than its design limit, the gear and the airplane must be inspected for structural damage.

The impact force applied to the landing gear strut is determined by the formula:

$$F = nLs = \frac{WV^2}{2g}$$

where $n$ is a coefficient of efficiency
$L$ is the load absorbed
$s$ is the deflection of the gear
$W$ is the weight of the plane
$V$ is the velocity at impact
$g$ is gravity.

From this formula it can be seen that the impact force is a direct function of the velocity at which the aircraft strikes the ground. If the aircraft lands at too great a velocity the maximum load which the airplane is designed to absorb will be exceeded. If the maximum load force is exceeded the elastic limit of the metal in parts of the landing gear and airplane structure may be exceeded and the metal will become permanently deformed. The force may even cause the part to rupture.

When a moving load is suddenly stopped by a resisting member, the kinetic energy of the body is absorbed by the resisting member. If the member had a uniform cross section and the energy were evenly distributed through the member, it would be capable of sustaining the maximum applied energy for a member of its size. The situation, however, is complicated. The airplane landing gear and the structure of the plane itself do not have a uniform cross section, screw holes, rivets and the like present areas of stress concentration, where the stress increases more rapidly than it doe elsewhere in the member.

These points will therefore reach the elastic limit before other points in the airplane. The amount of energy which can be absorbed without structural deformation is limited by the lowest elastic limit present. Each area of stress concentration will have its own elastic limit and as the energy absorbed increases past the first point of deformation more and more areas of deformation will occur. As the airplane is subjected to repeated stresses, fatigue failure is a factor and will cause the elastic limits of the areas of stress concentration to be reduced.

When the elastic limit of a metal is exceeded, the rate of change of stress, which is measured in pounds per square inch, shows a marked drop. The pressure in the strut of the landing gear which is measured in pounds per square inch will also show a marked drop. The measurement of this rate of change of pressure will indicate if an elastic limit has been exceeded.

When the velocity of loading and, correspondingly, the rate of change of pressure exceeds a critical value, the toughness of the metal will decrease rapidly with increasing velocity. A measurement of this rate of change is important because metal will tend to fracture when the critical value is exceeded.

A measurement of rate of change of pressure would enable maintenance personnel to determine the extent of structural inspections which are required.

The prior art utilized strain gauges to measure structural deformation. These devices are limited in that they do not measure the rate of change of the force applied. Furthermore, these devices do not give an output which is a direct repeatable function of the load applied to the airplane at the landing gear.

The prior art is also limited in that it does not provide means for measuring the points at which a plurality of elastic limits are exceeded.

SUMMARY OF THE INVENTION

The disclosed invention represents a significant advance over the prior art. The invention is capable of measuring the rate of change of applied loads. The invention also provides means by which this rate can be measured at a plurality of points.

The system is designed primarily for use with pneumatic devices. A pressure transducer is located within the pneumatic strut of an airplane's landing gear and yields an electrical output which varies with the pressure applied. The output of the sensor is fed to a plurality of signal level detectors. The output is also connected to one or more rate detectors. The rate detector will give an output when the rate of change of the signal from the transducer exceeds a given value. AND gates are connected to receive the output of each level detector and a rate detector. The simultaneous occurrences of pulses from the detectors will produce a pulse at the output of the AND gate which is applied to a flip-flop. The flip-flop in turn provides a pulse to a counter which records the pulse. The flip-flop will give only a single count for each event sensed by the transducer since it is necessary that it be reset after each pulse from the AND gate. The flip-flop is reset by means of a pulse from a reset level detector which will provide an output at a pressure below that to which its respective level detector is responsive.

It is an object of the present invention to provide a system which is capable of determining if an aircraft has been structurally damaged by impact at its landing gear.

It is a further object of the present invention to detect and record the rate of change of the load applied to an aircraft through its landing gear.

It is a still further object of the present invention to detect and record the level and rate of change of the load applied to an aircraft through its landing gear.

Other objects, advantages and novel features of the present invention will become apparent from the following detailed description of the invention when considered in conjunction with the accompanying drawings.

BRIEF DESCRIPTION OF THE DRAWINGS

FIG. 2 shows an alternate arrangement of the circuitry of FIG. 1.

DESCRIPTION OF THE PREFERRED EMBODIMENTS

Figure 1:
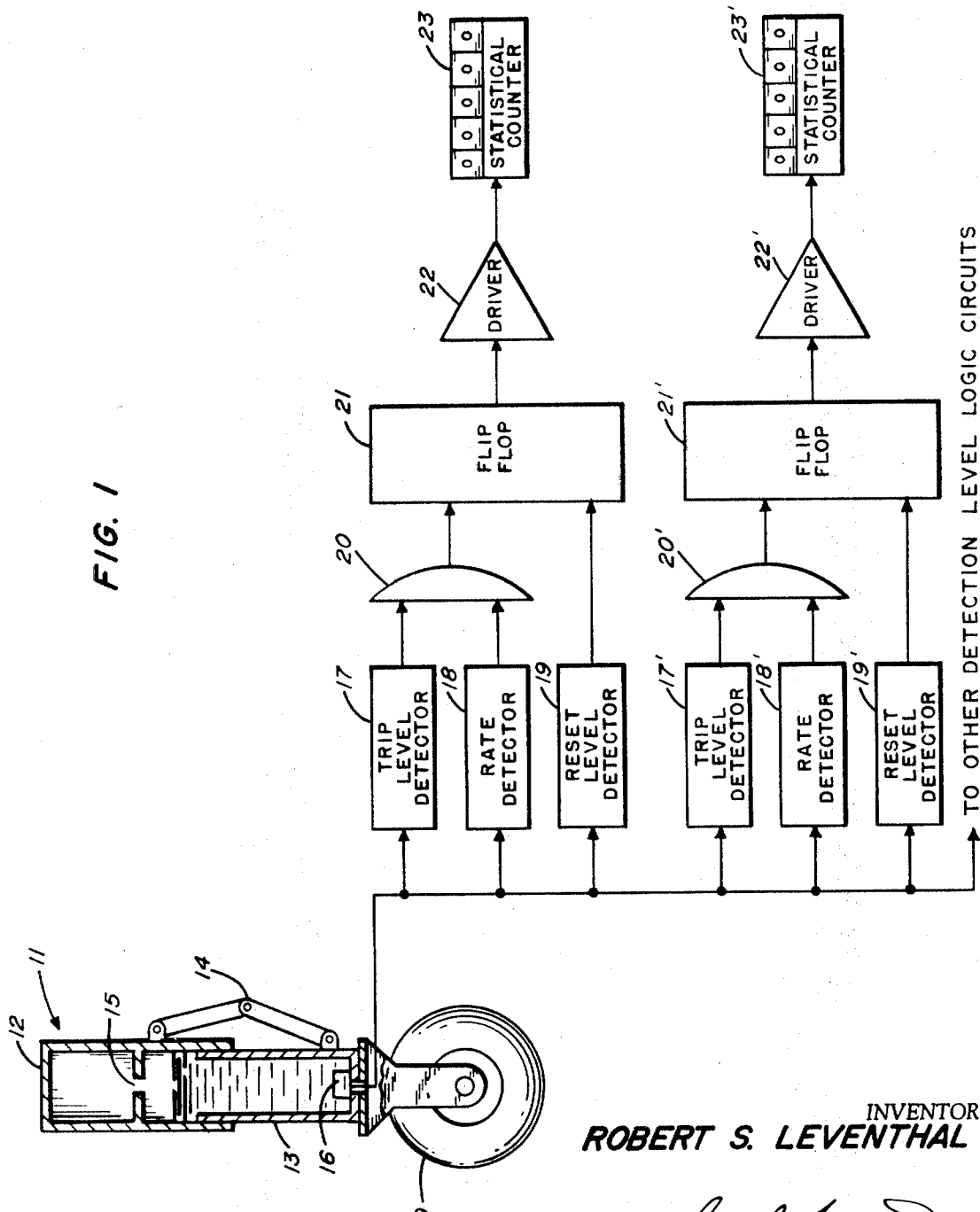
FIG. 1 shows the system embodied by the invention.

In FIG. 1, the pneumatic strut 11 in the landing gear of an aircraft is shown with the wheel 9 of the aircraft attached. The lower chamber 13 of the strut is filled with oil. The upper chamber 12 contains a gas. When the aircraft lands, its weight applies a compression force to the landing gear causing the strut to compress. The orifice 15 resists closure of the strut thereby applying a force to the oil and the pressure sensor. The force created in the strut changes the airplane's flight path from a downglide to a parallel glide. The scissor 14 guides the closure of the strut.

The pressure sensor 16 is connected to a logic circuit located in the aircraft. The pressure sensor utilized may be chosen from any of the well-fInown types of electric pressure transducers, such as the crystal or capacitive type, as well as the magnetic or resistive type. These transducers give an electrical output which varies with the pressure applied.

The logic circuit is responsive to the output of the pressure sensor. Referring to FIG. 1, the circuitry for only two detection levels is shown. Numerous other detection levels with identical circuitry are normally provided. The circuitry includes trip level detectors 17 and 17' which are responsive to a set level of pressure to give an output when the signal from the pressure sensor exceeds that level. The set level varies with each detector. A plurality of rate detectors 18 and 18' are connected to the pressure sensor. The rate detectors give a pulse output when the rate of change of the input voltage exceeds a given threshold. The outputs of these detectors are connected to AND gates 20 and 20' and flip-flops 21 and 21'. The outputs from the flip-flops are fed to driver amplifiers 22 and 22'.

A statistical counter records the pulses from the amplifier. Reset level detectors 19 and 19' are provided and are responsive to the output of the pressure sensor. The reset level detectors are responsive at a pressure level below that of the trip level detectors and are operative to bias off the flip-flop until their set level is exceeded.

The trip level detectors and reset detectors may be Schmitt trigger circuits. The rate detector is generally a series-capacitor high-pass filter with a low-pass shunt. The lower the capacity the higher the rate of signal change necessary to pass through the filter.

FIG. 2 differs from FIG. 1 in that a single rate detector 18 is utilized for all of the detection level logic circuits.

In operation, the aircraft touches down and the strut begins to compress. The pressure developed in the strut 11 is sensed by the pressure sensor 16. The first trip level detector 17 may be set at a level just above the pressure applied to the strut when the aircraft is stationary and the circuitry associated with it will record the normal loading applied to the landing gear. When the trip level detector is energized, it applies a first signal to the AND gate 20 and will continue to apply the signal to the AND gate as long as the pressure remains above the trip level. As the pressure in the strut increases the signal output will increase. The rate detector 18 measures the rate of change of the signal and gives a pulsed signal output when the rate of change of the signal exceeds a threshold. The simultaneous pulses from these two detectors energize the AND gate to cause it to give an output. The flip-flop 21 is biased on by the reset level detector which is responsive to a signal below that of trip level detector 17. The flip-flop will give a pulsed output when it receives a signal from the AND gate. The signal is amplified at 22 and energizes the statistical counter which counts the pulses received and gives a visual indication of the number of pulses received.

The flip-flop must be reset after each pulse from the AND gate before another counting pulse will be generated and the reset detector will not meet the flip-flop until the signal first falls below its set level. This insures that the counter will register only a single count for each event sensed by the sensor, notwithstanding the possible generation of additional output pulses from the AND gate. In a practical sense this arrangement prevents multiple counts from being registered as a result of a bumpy impact of the landing gear with the landing field. However, a new count can be registered if the plane bounces from the ground for an interval sufficient for the landing gear and reset detector to return to its normal condition before the next impact.

The counter records the number of times that the landing gear experiences a particular rate of change of load. This counter accumulates statistical data for fatigue life verification to thereby indicate what area of the airplane should be analyzed for fatigue failure or fracture.

The operation of successive detection level logic circuits is identical with the first detection level logic circuit described above.

Each level detector is set to be responsive to a different pressure. The second detector 17' may be responsive to pressure in the gear which is just below the pressure present when the landing gear is at its lowest elastic limit. Successive detectors are set to be activated by pressure at successively higher pressure. A single rate detector may be used for each detection level circuit as shown in FIG. 2 or a plurality of rate detectors may be used as shown in FIG. 1. Furthermore, a single reset level detector may also be used. The advantage of using a plurality of detectors lies in the ability to set a plurality of different rates of change to which the system is responsive.

It is therefore seen that new and novel means for measuring the level and rate of change of applied loads is disclosed.

Obviously many modifications and variations are possible in light of the above teachings. It is therefore to be understood that within the scope of the appended claims the invention may be practiced otherwise than as specifically described.

What is claimed is:

1. A system for determining the occurrence of a certain level load at a certain rate of change comprising:
    a sensor mounted on a member to which the load is to be applied and operative to give a signal varying with the level of the applied load;
    a detection circuit connected to said sensor for determining the occurrence of a signal from the sensor having a certain level and rate of change and operable to give an output when said signal exceeds a predetermined level and rate of change; and
    circuit means operable to give a visual indication of the occurrence of the signal detected by the detector circuit connected to said detector circuit.

2. The system of claim 1 wherein
    a plurality of said detection circuits operable in response to different predetermined levels and rates of change, and a plurality of said circuit means are provided.

3. The system of claim 1 wherein said detection circuit comprises:
   a level detector connected to said sensor and responsive to its signal to give an output when said signal reaches a predetermined level;
   a rate of change of signal detector connected to said sensor and responsive to its signal to give a pulsed output when the rate of change of the input signal exceeds a given threshold; and
   an AND gate connected to receive the outputs of said level detector and said rate detector and operative to give an output when it receives coincident signals from said detectors.

4. The system of claim 3 wherein
   a plurality of detection circuits operable in response to different predetermined levels and a plurality of circuit means are provided.

5. The system of claim 3 wherein said circuit means comprises:
   a flip-flop circuit operable for a predetermined time connected to receive the output of said AND gate;
   a reset level detector connected to said sensor and flip-flop circuit to de-energize said flip-flop circuit when the signal from said sensor falls below a predetermined level; and
   a statistical counter connected to said flip-flop circuit to give a visual indication of the signal output from said flip-flop circuit.

6. The system of claim 5 wherein:
   a plurality of detector circuits operable in response to different predetermined levels and a plurality of circuit means are provided.

7. The system of claim 1 wherein said detection circuit further comprises:
   a plurality of level detectors, each connected to said sensor and responsive to its signal to give an output when said signal reaches a predetermined level, said predetermined level being different for each detector;
   a rate of change of signal detector connected to said sensor and responsive to its signal to give a pulsed output when the rate of change of the input signal exceeds a given threshold; and
   a plurality of AND gates equal in number to the level detectors provided and each connected to receive the outputs of a different level detector and said rate detector and each operative to give an output when it receives coincident signals from said detectors.

8. The system of claim 7 wherein
   a plurality of said circuit means each connected to the output of one of said AND gates is provided.

9. The system of claim 8 wherein said circuit means comprises:
   a flip-flop circuit operable for a predetermined time connected to receive the output of one of said AND gates;
   a reset level detector connected to said sensor and flip-flop circuit to de-energize said flip-flop circuit when the signal from said sensor falls below a predetermined level; and
   a statistical counter connected to said flip-flop circuit to give a visual indication of the signal output from said flip-flop circuit.

10. The system of claim 1 wherein said circuit means comprises:
    a flip-flop circuit operable for a predetermined time connected to receive the output of said detection means;
    a reset level detector connected to said sensor and flip-flop circuit to de-energize said flip-flop circuit when the signal from said sensor falls below a predetermined level; and
    a statistical counter connected to said flip-flop circuit.

References Cited

UNITED STATES PATENTS

| | | | |
|---|---|---|---|
| 2,275,675 | 3/1942 | Draper | 73—35 |
| 3,263,497 | 8/1966 | Leiber | 73—141 |
| 3,274,503 | 9/1966 | Peterson | 329—104 |
| 3,295,364 | 1/1967 | Van Dyke | 73—88.5 |
| 3,359,410 | 12/1967 | Frisby | 235—183 |

RICHARD C. QUEISSER, Primary Examiner

J. W. WHALEN, Assistant Examiner

U.S. Cl. X.R.

73—141